(12) United States Patent
Sauer et al.

(10) Patent No.: US 12,340,265 B2
(45) Date of Patent: Jun. 24, 2025

(54) METHOD FOR PRODUCING A CHIP CARD BODY

(71) Applicant: GIESECKE+DEVRIENT EPAYMENTS GMBH, Munich (DE)

(72) Inventors: Thorsten Sauer, Erding (DE); Michael Baldischweiler, Munich (DE); Thomas Tarantino, Laufen (DE)

(73) Assignee: GIESECKE+DEVRIENT EPAYMENTS GMBH, Munich (DE)

( * ) Notice: Subject to any disclaimer, the term of this patent is extended or adjusted under 35 U.S.C. 154(b) by 10 days.

(21) Appl. No.: 18/569,907

(22) PCT Filed: Jun. 24, 2022

(86) PCT No.: PCT/EP2022/025290
§ 371 (c)(1),
(2) Date: Dec. 13, 2023

(87) PCT Pub. No.: WO2023/274575
PCT Pub. Date: Jan. 5, 2023

(65) Prior Publication Data
US 2024/0273328 A1 Aug. 15, 2024

(30) Foreign Application Priority Data
Jun. 29, 2021 (DE) ............ 10 2021 003 336.1

(51) Int. Cl.
*G06K 19/077* (2006.01)
(52) U.S. Cl.
CPC . *G06K 19/07718* (2013.01); *G06K 19/07722* (2013.01); *G06K 19/07749* (2013.01)

(58) Field of Classification Search
CPC ....... G06K 19/07718; G06K 19/07722; G06K 19/07749
USPC ........................................... 235/492
See application file for complete search history.

(56) References Cited

U.S. PATENT DOCUMENTS

| | | | | |
|---|---|---|---|---|
| 5,837,992 A | * | 11/1998 | Onozawa | G06K 19/07728 235/382 |
| 2013/0260065 A1 | * | 10/2013 | Cox | H05K 13/00 428/35.8 |
| 2016/0110639 A1 | | 4/2016 | Finn et al. | |
| 2017/0308785 A1 | | 10/2017 | Kim et al. | |
| 2019/0384261 A1 | | 12/2019 | Nam et al. | |
| 2020/0151534 A1 | * | 5/2020 | Lotya | G06K 19/07722 |

(Continued)

FOREIGN PATENT DOCUMENTS

DE 102020004144 A1 1/2022

OTHER PUBLICATIONS

International Search Report from corresponding PCT Application No. PCT/EP2022/025290, Oct. 17, 2022.

*Primary Examiner* — Michael G Lee
*Assistant Examiner* — David Tardif
(74) *Attorney, Agent, or Firm* — Workman Nydegger (57) ABSTRACT

A method is provided for producing a chip card body having a metallic core layer for a contactless or dual-interface chip card. A slot in the metallic core layer for reducing eddy currents is generated not in the metallic multiple-copy sheet itself but instead only in the metallic core layer extracted from the metallic multiple-copy sheet. In this way, there are no short-circuit-forming metal chips left in the slot, since the slot is generated only after the extraction of the metallic core layer from the multiple-copy sheet.

15 Claims, 8 Drawing Sheets

(56) References Cited

U.S. PATENT DOCUMENTS

2021/0158124 A1* 5/2021 Lowe .............. G06K 19/07722
2022/0051064 A1* 2/2022 Lowe .................. B42D 25/373
2023/0274119 A1   8/2023 Baldischweiler

* cited by examiner

METHOD FOR PRODUCING A CHIP CARD BODY

BACKGROUND

The present invention relates to a method for producing a chip card body having a metallic core layer for a contactless or dual-interface chip card, and to a method for producing the chip card.

A contactless or dual-interface chip card comprises a card body, a chip, and an antenna coil coupled to the chip. The antenna coil is located either in a chip module which comprises the chip or in the card body. A conventional card body is produced from thermoplastic material, such as PVC, PET, PETG or ABS, which, however, are sometimes susceptible to cracks and breaks. For example, the chip card can break in a trouser pocket due to torsion.

Compared to conventional card bodies, a card body having a metallic core layer has an increased service life thanks to its relatively greater resistance to torsion. Furthermore, the metallic chip card feels high-quality and robust with regard to its weight. However, by integrating the metallic core layer into the card body, the contactless function of the chip card is substantially damped, so that the switching distance between the chip card and a card reader drops. This is because the metal material generally shields electromagnetic waves. This is due to the fact that the energy transmitted by the card reader to the chip card by means of electromagnetic waves is partially absorbed and reflected by the metallic core layer. In particular if the chip card is in an alternating magnetic field of the card reader, electrons in the metallic core layer move around the chip module along a direction of flow, such that an eddy current arises due to the movement of the electrons. On the one hand, due to the eddy current generated, the transmitted energy is lost as heat, which is also referred to as "absorption", and, on the other hand, an intrinsic magnetic field is generated which counteracts a change in the alternating magnetic field which it has generated, which is also referred to as "reflection". Since the transmitted energy is more or less lost due to the eddy current, this means that the remaining energy that can actually be used by the chip module for contactless communication is correspondingly smaller than the transmitted energy, i.e., that the switching distance has to be reduced due to the eddy current. If the remaining energy is less than a threshold value, for example 2 V, which is decisive for the circuit of the chip module, the chip card does not function.

Various manufacturing methods are known in order to counter the damping influence of the metallic core layer. US 2016/0110639 A1 discloses a chip card which comprises, on the one hand, a chip module having a chip and a module antenna and, on the other hand, a metallic card body core layer having a cavity for receiving the chip module and a slot. The slot overlaps the module antenna and extends from the chip module to an outer edge of the metallic card body core layer. It is used to a certain extent to reduce the above-mentioned damping influence and to increase the lowered switching distance by interrupting the flow of electrons in the metallic card body core layer. Since the originally closed eddy current circuit is destroyed around the chip module and no more eddy current can arise in the surroundings of the chip module, the energy available for the functionality of the chip module is correspondingly increased. On the one hand, the slot should be as wide as possible in order to effectively prevent the eddy current, and on the other hand the slot should be as narrow as possible with regard to the mechanical stability of the chip card. The slot can be cut or chemically etched, for example, by means of a laser. In order to reinforce the stability of the chip card, the slot can be at least partially filled with an electrically non-conductive polymer, epoxy resin or reinforcing epoxy resin. It is important that no metal material remains in the slot during production. A remaining portion of the metal material can cause a partial closure or even a complete closure in the continuous opening of the slot, which reduces the effectiveness of the slot accordingly.

The metallic card body core layer is regularly laminated with at least one further cover layer. During lamination, impurities or a partial closure or even complete closure in the slot may arise. It can thus happen that, due to the high pressure, an initially clean and thin slot is compressed by distortion and forms a contact. Such chip cards are then not functional. Due to the present cover layer, however, the slot is no longer accessible for inspection.

Currently, a method for producing chip card bodies having metallic core layers for contactless or dual-interface chip cards is carried out, for example, as follows. First, a metallic multiple-copy sheet is provided for a plurality of metallic core layers. A corresponding plurality of cavities for fixing a corresponding plurality of chip modules and a plurality of slots are produced in the provided metallic multiple-copy sheet. The metal multiple-copy sheet can be laminated with at least one cover layer. Finally, the corresponding plurality of metallic core layers is extracted from the metallic and optionally also laminated multiple-copy sheet.

It is difficult to punch out the chip card body from the multiple-copy sheet when the chip card body comprises a metallic core layer with a thickness of more than 0.4 mm. This means that a hybrid chip card body or multilayer chip card body having a metallic core layer that has a thickness above 0.4 mm, or a single-layer metallic chip card body has to be milled out of the metallic multiple-copy sheet. However, a partial closure or even complete closure in the slot due to the metal chips can arise during milling. In this case, edge flaking, detachment of the metallic and possibly laminated multiple-copy sheet, burning of the at least one cover layer, and so on, may also occur. This can lead to the need for chip card bodies to be disposed of, which increases the production costs of such chip cards.

SUMMARY

The object of the present invention is therefore to lower the production costs of contactless or dual-interface chip cards.

A first aspect of the invention relates to the method for producing a metallic chip card body. According to this first aspect of the invention, the method begins with providing the metallic multiple-copy sheet for a plurality of metallic core layers. A corresponding plurality of cavities for fixing a corresponding plurality of chip modules therein is generated before or preferably simultaneously with the extraction of the plurality of metallic core layers from the provided metallic multiple-copy sheet. At least one slot is then generated in one of the plurality of metallic core layers extracted from the metallic multiple-copy sheet.

A fundamental concept of the present invention is thus to generate the at least one slot not directly in the metallic multiple-copy sheet, but instead only in the metallic core layer extracted from the metallic multiple-copy sheet. Even if the metallic core layer with a thickness above 0.4 mm has to be milled out of the metallic multiple-copy sheet, no metal chips are formed in the slot, since the slot is only generated after milling and thus the possibility of metal chips remaining during milling can be completely prevented. This results in fewer rejects, so that the production costs are lowered accordingly.

Compared to the above-mentioned current method, the method according to the first aspect has the further advantage that a necessary monitoring step for removing the metal chips in the slot can be omitted.

The cavities, the at least one slot and the metallic core layers can each be generated by means of a laser or water jet cutting, preferably in a common laser process, in order to reduce the production time. Alternatively, the cavities and the metallic core layers can be punched out, preferably simultaneously in one punching process. This makes it possible to work with existing punching machines whose punching heads just have to be adapted in such a way that the cavities and the metallic core layers can be punched out simultaneously. Alternatively, the at least one slot can also be chemically etched.

The at least one slot can extend from the cavity to an edge of the metallic core layer extracted from the metallic multiple-copy sheet. It should be generated with a width between 30 µm and 100 µm, preferably between 50 µm and 80 µm, in order to achieve an optimal compromise between the effective prevention of eddy currents in the surroundings of the cavity and the mechanical stability of the chip card body. Subsequently, the at least one slot can be at least partially filled with an electrically non-conductive material, e.g., polymer, epoxy resin or reinforcing epoxy resin, in order to reinforce the mechanical stability of the metallic chip card body.

A second aspect of the invention relates to the method for producing a hybrid chip card body having the metallic core layer and at least one cover layer. According to this second aspect of the invention, the method begins with providing the at least one cover layer which, for example, can be a transparent cover layer and/or a layer with a printed pattern and/or any other layer. In particular, it can have security features. Subsequently, the at least one cover layer is laminated with the extracted metallic core layer. Before or preferably after lamination, at least one continuous chip module opening in the at least one cover layer can be generated for fixing the chip module.

The at least one cover layer can also be extracted from a multiple-copy sheet for a plurality of cover layers, e.g., by punching out. Prior to this, the multiple-copy sheet for the plurality of cover layers is, preferably at an appropriate temperature and appropriate pressure, prelaminated over a sufficient period of time such that no shrinkage of the at least one cover layer extracted from the multiple-copy sheet arises in the subsequent step of laminating the at least one cover layer with the metallic core layer. In other words, the at least one cover layer, which is generally a polymer layer, is relaxed under pressure and temperature as long as it is still part of the multiple-copy sheet for the plurality of cover layers, and the at least one relaxed or prelaminated cover layer is then extracted from the multiple-copy sheet. To the extent necessary, an adhesive layer is applied either on one side of the at least one cover layer or on one side of the metallic core layer, e.g., by screen printing, knife coating or spraying, with which the corresponding other layer is laminated.

The metallic core layer and the at least one cover layer can then be inserted into a holding frame for holding the chip card body, e.g., one or two cover layers above and/or below the metallic core layer. The holding frame can comprise a single or a plurality of frame units, and a single chip card body can be inserted into each frame unit. The holding frame preferably has the same plurality of frame units as the plurality of metallic core layers of the metallic multiple-copy sheet and/or the plurality of cover layers of the multiple-copy sheet. Furthermore, the frame unit can be the same size as the chip card body, and it should not form any adhesion and/or bond to the chip card body. For this purpose, for example, a silicone frame or a Teflon frame is suitable.

If the at least one cover layer is inserted on the side of the metallic core layer on which the cavity of the metallic core layer is located, an insert, e.g., a PVC or Teflon insert or a comparable filler material, can be placed in the cavity of the metallic core layer, or a suitable filler can be dispensed in order to prevent the at least one cover layer from collapsing in the region of the cavity during lamination. The filler can be introduced into the cavity simultaneously with the application of the adhesive layer. The insert or the filler is preferably the same size as or slightly smaller than the cavity of the metallic core layer. Likewise, an electrically non-conductive material, e.g., polymer, epoxy resin or reinforcing epoxy resin, can be at least partially filled into the at least one slot of the metallic core layer in order to reinforce the mechanical stability of the hybrid chip card body. Alternatively, an insert made of the electrically non-conductive material can be introduced into the at least one slot of the metallic core layer.

After the metallic core layer and the at least one cover layer are inserted into the frame unit, a corresponding lamination plate, which serves to compress the metallic core layer and the at least one cover layer, can cover the holding frame such that no air remains between the metallic core layer and the at least one cover layer. This is because the air can cause unevenness during lamination. In addition, the lamination plate, just like the holding frame, should not form any adhesion and/or bonding to the chip card body.

The continuous chip module opening can be generated in the at least one cover layer even before lamination for later fixing of the chip module. In this case, the lamination plate can comprise an attachment which, when the holding frame is covered, extends into the continuous chip module opening of the at least one cover layer. By means of this attachment, distortion of the continuous chip module opening during lamination can be prevented. Alternatively, the continuous chip module opening can be generated only after lamination and before the fixing of the chip module, e.g., by milling.

In the case of the hybrid chip card body having a metallic core layer and at least one cover layer laminated thereto, the method according to the second aspect of the invention is particularly advantageous compared to production methods in which the slots are generated in the metal multiple-copy sheet and the metal multiple-copy sheet is laminated as a whole with a large-area cover layer. In such methods, due to the cover layer laminated with the metallic multiple-copy sheet, it is hardly possible to identify contact bridges within the slots that arise during lamination.

A third aspect of the invention relates to the production of the contactless or dual-interface chip card using the production method according to either the first aspect of the invention or the second aspect of the invention. The method begins with providing a chip module with a chip, preferably an RFID or an NFC chip, and an antenna coil coupled to the chip, preferably an inductively coupling antenna coil having at least one turn. The chip module provided is fixed in the cavity of the metallic core layer and optionally in the continuous chip module opening of the at least one cover layer, for example by means of an adhesive. If the cavity of the metallic core layer is still occupied by the aforementioned insert or the filler, this can be removed before the chip module is fixed.

BRIEF DESCRIPTION OF THE DRAWINGS

The present invention is described by way of example below with reference to the accompanying drawings, wherein the representations are purely schematic. Therein, the following are shown.

DETAILED DESCRIPTION OF VARIOUS EMBODIMENTS

Figure 1A:
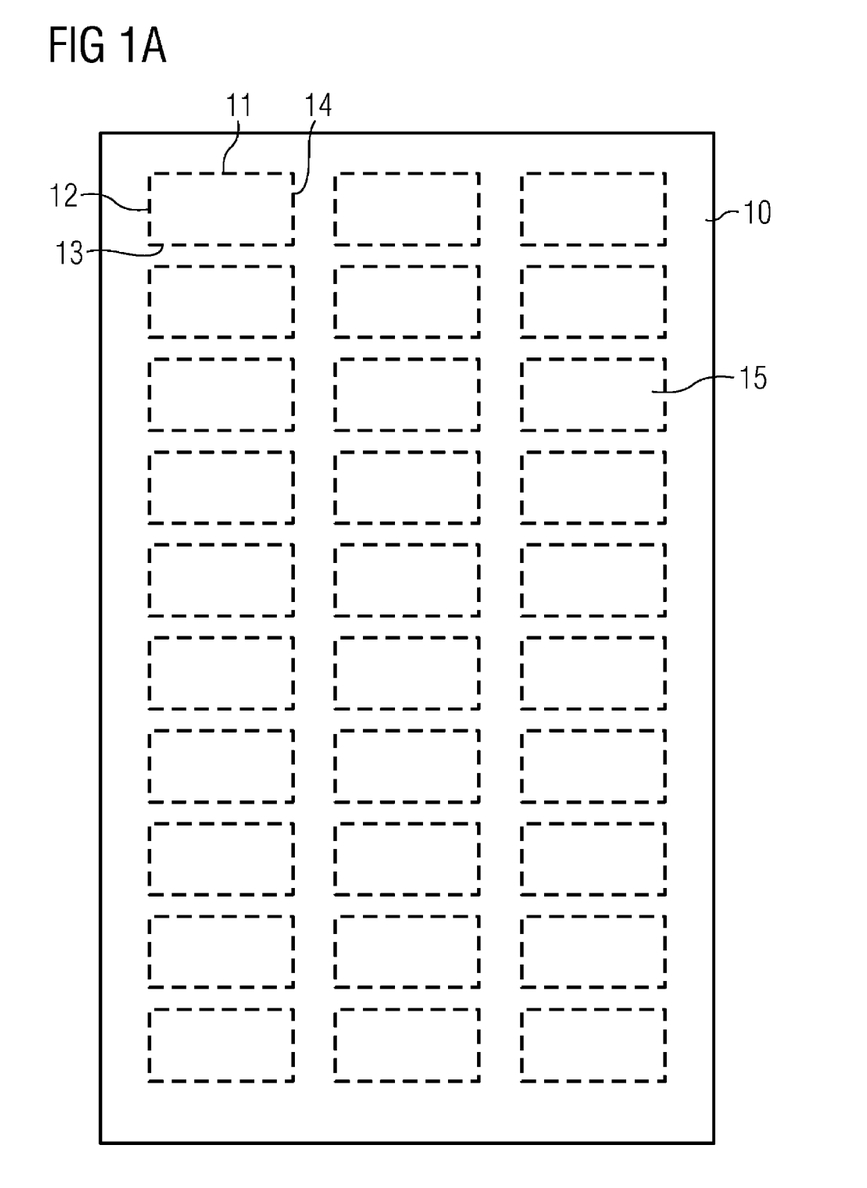
FIG. 1A is a plan view of a metallic multiple-copy sheet 10 for a plurality of metallic core layers 15.

FIG. 1A is the plan view of a metallic multiple-copy sheet 10 for a plurality of metallic core layers 15 of the same size. The metallic multiple-copy sheet 10 has a plurality of cutting lines 11, 12, 13, 14 along which the metallic core layers 15 can be extracted from the metallic multiple-copy sheet 10 in a further step. The cutting lines 11, 12, 13, 14 can be visible and/or virtual lines. The thickness of the metallic multiple-copy sheet 10 should not exceed the maximum thickness of a chip card body according to ISO 7810. Deviating from FIG. 1A, the total number of metallic core layers 15 and/or the number of metallic core layers 15 per row and column of the metallic multiple-copy sheet 10 can be changed as required.

Figure 1B:
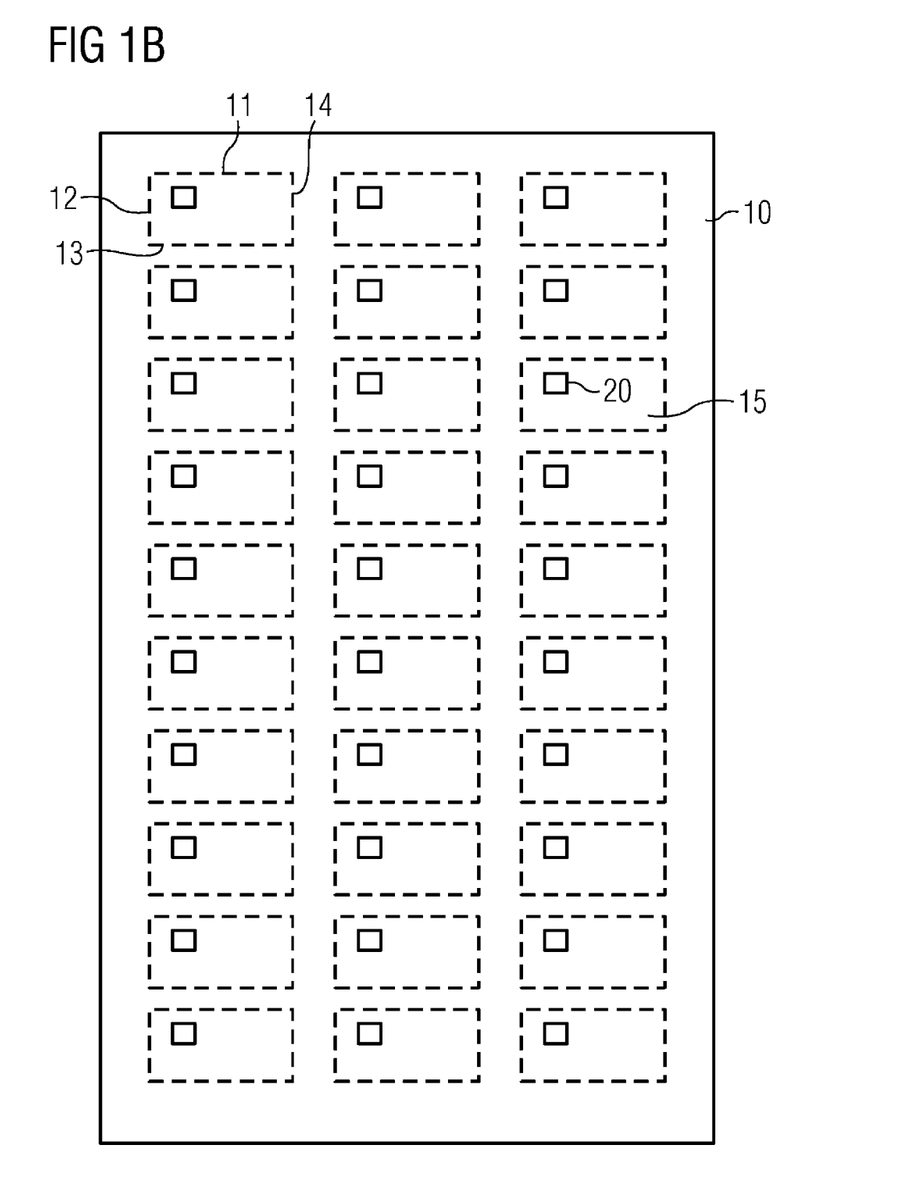
FIG. 1B is the plan view of the metallic multiple-copy sheet 10 for the plurality of metallic core layers 15 according to FIG. 1A, in which each metallic core layer 15 has a cavity 20.

FIG. 1B is the plan view of the metallic multiple-copy sheet 10 according to FIG. 1A, wherein each of the metallic core layers 15 of the multiple-copy sheet 10 has a cavity 20 for fixing a chip module 90. The cavities 20 can be generated directly in the multiple-copy sheet 10 before or after or preferably simultaneously with the extraction of the plurality of metallic core layers 15 from the multiple-copy sheet 10, e.g., can be punched out in a punching process or milled out in a milling process or lasered using a water jet method or in a laser process.

Figure 1C:
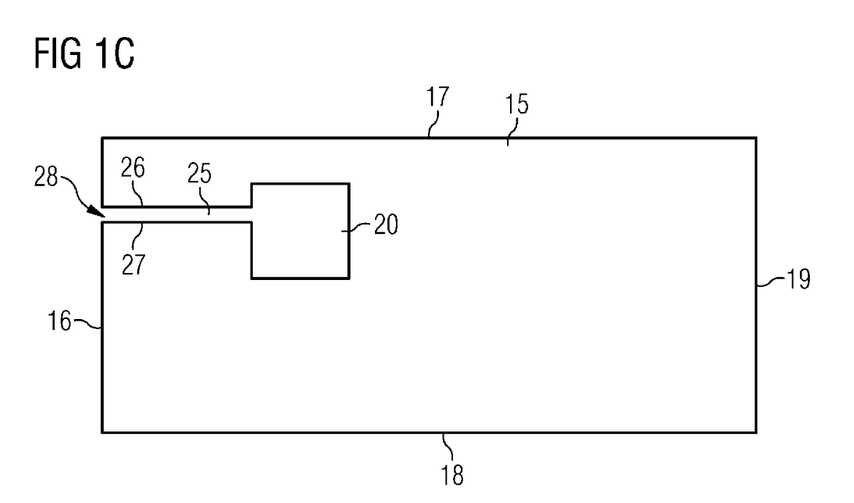
FIG. 1C is a plan view of a metallic core layer 15 extracted from the metallic multiple-copy sheet 10 according to FIG. 1A or FIG. 1B, which core layer has the cavity 20 and a slot 25.

FIG. 1C is the plan view of a metallic core layer 15 extracted from the metallic multiple-copy sheet 10 according to FIG. 1A or FIG. 1B, which core layer has the cavity 20 for fixing the chip module 90 and a slot 25. The slot 25 is generated only in the metallic core layer 15 extracted from the metallic multiple-copy sheet 10, namely so that it extends from the cavity 20 to an edge 16 of the metallic core layer 15. In particular, it has a continuous opening 28 over its entire length, in which opening the two walls 26, 27 of the slot 25 do not contact each other. Alternatively, the slot 25 can extend from the cavity 20 up to one of the other three edges 17, 18, 19 of the metallic core layer 15. Deviating from FIG. 1C, the length, depth, width, shape, direction of the slot 25 and angular position between the slot 25 and one edge 16, 17, 18, 19 of the metallic core layer 15 and the number of slots 25 can be changed as required.

Figure 1D:
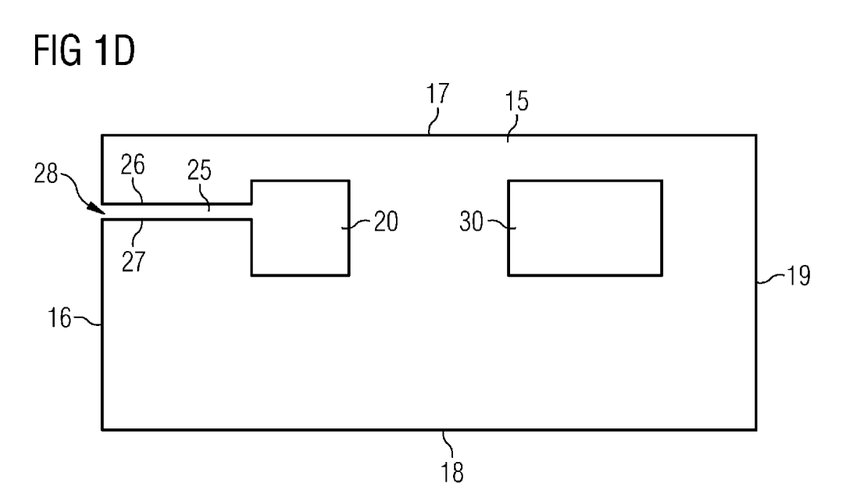
FIG. 1D is a plan view of the metallic core layer 15 according to FIG. 1C, which has a second cavity 30.

FIG. 1D is the plan view of the metallic core layer 15 according to FIG. 1C, which, in addition to the cavity 20 for fixing the chip module 90 and the slot 25, also has a second cavity 30, for example for fixing a display for presenting information from the chip module 90 and/or from a chip card reader. The second cavity 30 for fixing the display can be generated before or after or preferably simultaneously with the generation of the cavity 20 for fixing the chip module 90. Deviating from FIG. 1D, the length, width, depth and position of the second cavity 30 can be changed as required.

Figure 2:
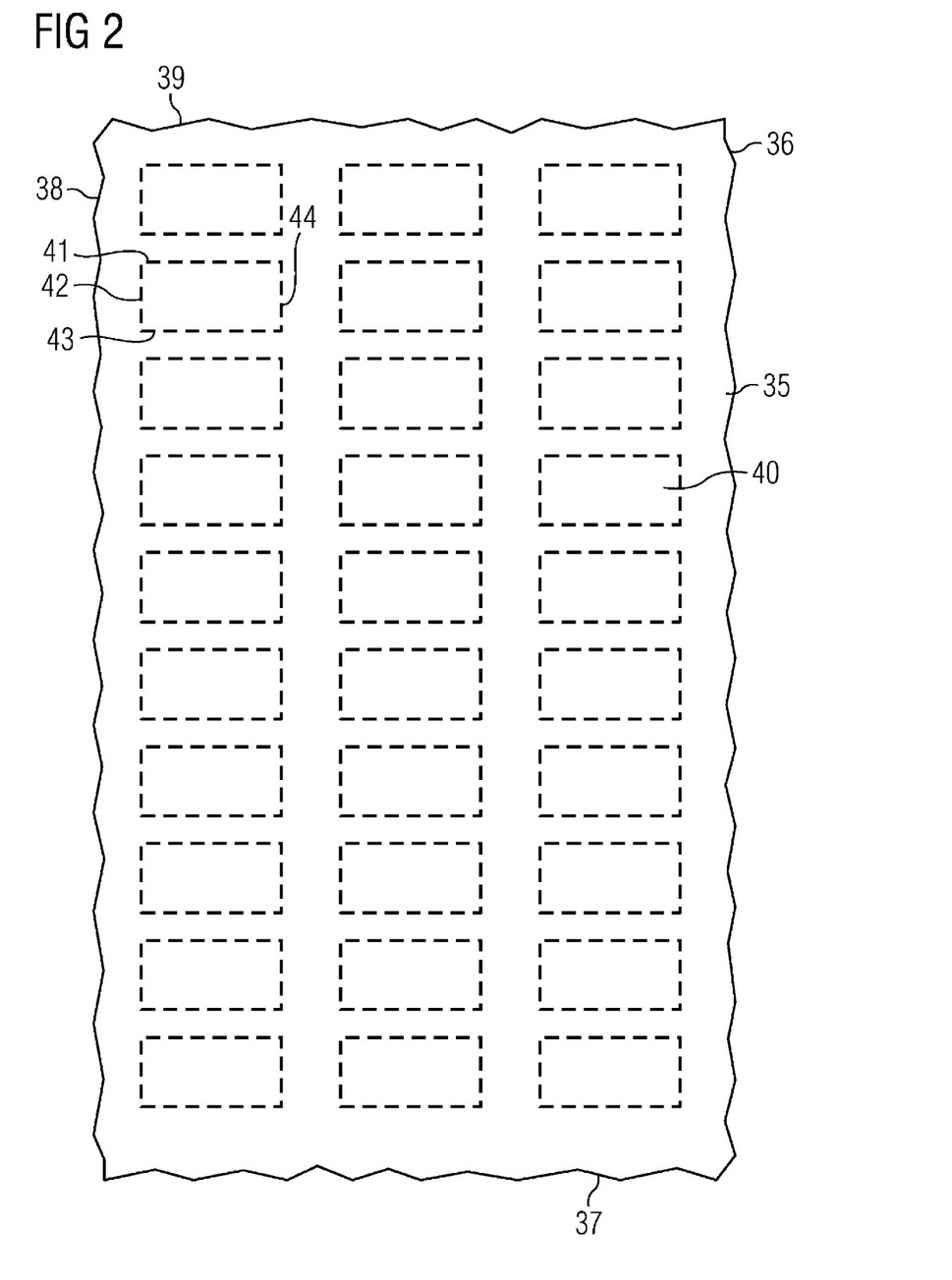
FIG. 2 is a plan view of a prelaminated multiple-copy sheet 35 for a plurality of cover layers 40.

FIG. 2 shows, in plan view, a multiple-copy sheet 35, which has already been prelaminated, for producing a plurality of cover layers 40 of the same size. The multiple-copy sheet 35 can be the same size as or preferably slightly larger than the metallic multiple-copy sheet 10 according to FIGS. 1A and 1B before prelamination, in order to compensate for shrinkage of edges 36, 37, 38, 39 of the multiple-copy sheet 35 arising under pressure and/or temperature. A plurality of cutting lines 41, 42, 43, 44 of the multiple-copy sheet 35, along which the cover layers 40 are extracted from the multiple-copy sheet 35, can be formed by visible and/or virtual lines, and the extracted cover layers 40 should be the same size as the metallic core layers 15 extracted from the metallic multiple-copy sheet 10 according to Figures IC and ID. The cover layer multiple-copy sheet 35 can be, for example, a transparent multiple-copy sheet and/or a multiple-copy sheet with a printed pattern and/or any other multiple-copy sheet. It can in particular have security features.

Figure 3:
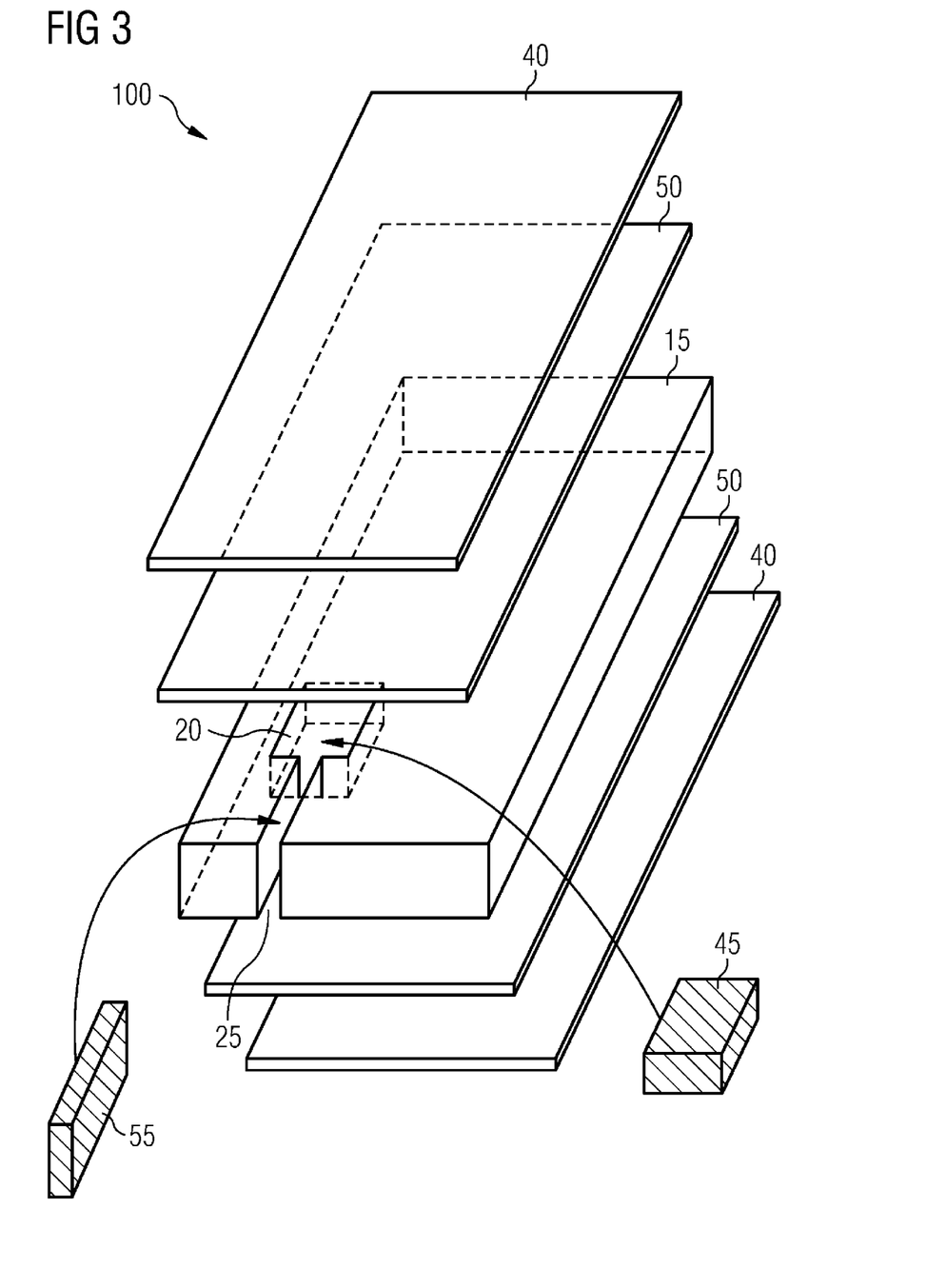
FIG. 3 is an exploded view of the components for producing a chip card body 100 having the metallic core layer 15 according to FIG. 1C and two cover layers 40 extracted from the multiple-copy sheet 35 according to FIG. 2 and two inserts 45, 55.

FIG. 3 is an exploded view of the components for producing a chip card body 100 having the metallic core layer 15 according to FIG. 1C, and cover layers 40 according to FIG. 2, one to be laminated with the metallic core layer from above and one from below. FIG. 3 also shows an insert 45, e.g., a PVC or Teflon insert, to be inserted into the cavity 20 of the metallic core layer 15 before the metallic core layer 15 is laminated with the cover layers 40, and an insert 55 consisting of electrically non-conductive material, e.g., polymer, epoxy resin or reinforcing epoxy resin, to be inserted into the at least one slot 25 of the metallic core layer 15 before the metallic core layer 15 is laminated with the cover layers 40. The inserts 45, 55 for the cavity 20 and the slot 25 of the metallic core layer 15 are preferably the same size as the cavity 20 and the slot 25 of the metallic core layer 15, and serve to prevent the upper and lower cover layers 40 from collapsing into the cavity 20 of the metallic core layer 15 during lamination. Deviating from FIG. 3, the cavity 20 and the slot 25 of the metallic core layer 15 can be filled with filler. At least one adhesive layer 50 can be applied, for example by screen printing, spraying or knife coating, on one or both sides of the metallic core layer 15 and/or on a lower side of the upper cover layer 40 and/or on an upper side of the lower cover layer 40. Alternatively, the at least one adhesive layer 50 can be applied directly to the metallic multiple-copy sheet 10 and/or to the cover layer multiple-copy sheet 35.

Figure 4:
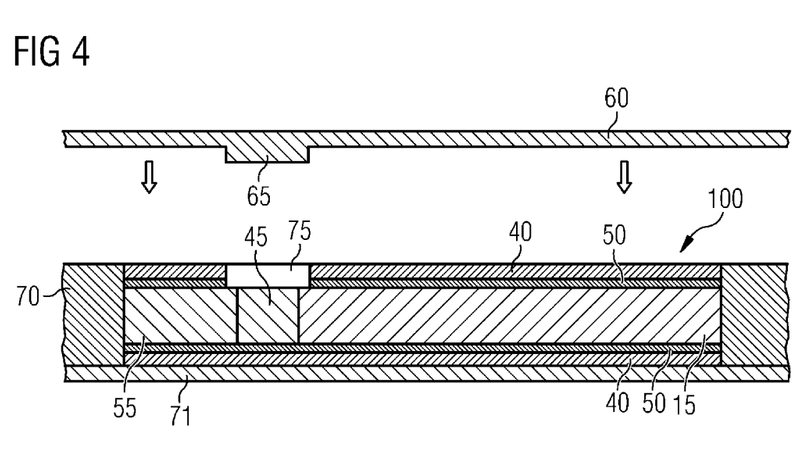
FIG. 4 is a cross-sectional view of the chip card body 100 positioned in a holding frame 70 according to FIG. 3 and of a lamination plate 60.

FIG. 4 is a cross-sectional view of the chip card body 100 according to FIG. 3 placed in a frame unit 80 of a larger holding frame 70, which is not shown here. The frame unit 80, e.g., a silicone frame or a Teflon frame, can hold the chip card body 100 during lamination and can be the same size as the chip card body 100. FIG. 4 also shows the lamination plate 60, which covers the holding frame 70 during lamination. First, one of the two cover layers 40 is laid on the bottom 71 of the frame unit 80, and then the metallic core layer 15 is placed onto the cover layer 40. Subsequently, the two aforementioned inserts 45, 55 according to FIG. 3 are inserted into the cavity 20 and into the slot 25 of the metallic core layer 15, and finally the other cover layer 40 is placed onto the metallic core layer 15. The upper cover layer 40, which is located on the side of the cavity 20 of the metallic core layer 15, can have a continuous chip module opening 75 for fixing the chip module 90 in place later. This continuous chip module opening 75 can be punched out, in a punching process before lamination, directly in the upper cover layer 40 or preferably simultaneously with the extraction of the plurality of cover layers 40 from the cover layer multiple-copy sheet 35 according to FIG. 2. For this purpose, the lamination plate 60 can have an attachment 65 which extends into the continuous chip module opening 75 of the upper cover layer 40 when the holding frame 70 is covered. Alternatively, when covering the holding frame 70, the attachment 65 of the lamination plate 60 can extend not only into the continuous chip module opening 75 of the upper cover layer 40 but also into the cavity 20 of the metallic core layer 15. In this case, the insert 45 for the cavity 20 according to FIG. 3 is not inserted into the cavity 20. Deviating from FIG. 4, the continuous chip module opening 75 of the upper cover layer 40 can be generated only after lamination and before the fixing of the chip module 90, and in this case the attachment 65 of the lamination plate 60 is not required. After covering the holding frame 70 by means of the lamination plate 60, the metallic core layer 15 is laminated with the cover layers 40 by means of the adhesive layers 50 under pressure and/or temperature.

Figure 5:
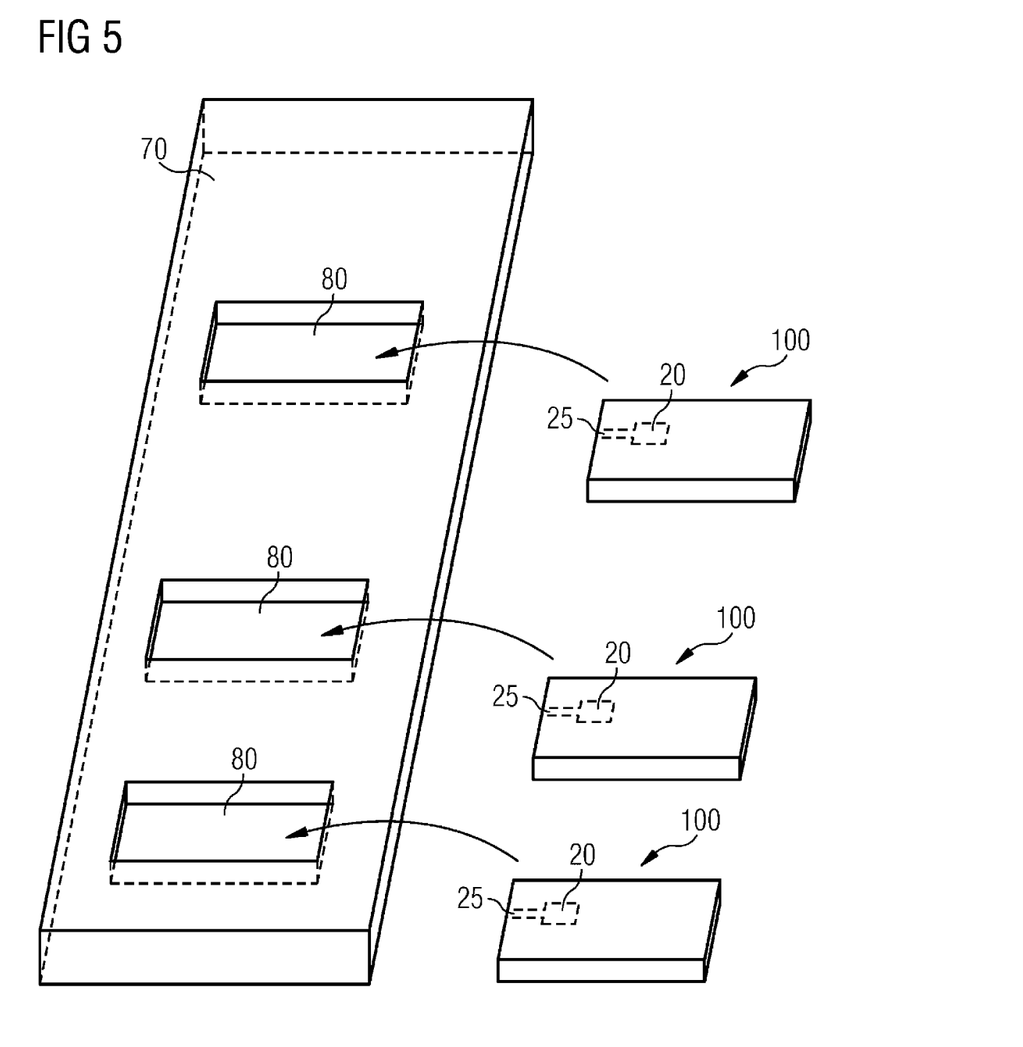
FIG. 5 is a perspective view of the holding frame 70 according to FIG. 4 having a plurality of frame units 80 for holding the corresponding plurality of chip card bodies 100 according to FIGS. 3 and 4.

FIG. 5 is a perspective view of the holding frame 70 having a corresponding plurality of frame units 80 according to FIG. 4 for holding the corresponding plurality of chip card bodies 100 according to FIGS. 3 and 4. A single chip card body 100 is inserted into each frame unit 80 of the holding frame 70. The frame unit 80 is the same size as the chip card body 100 and does not adhere and/or bond to the chip card body 100. The holding frame 70 and the chip card bodies 100 positioned in the frame units 80 of the holding frame 70 and the lamination plate 60 according to FIG. 4 can be inserted as a whole into a laminator. After lamination, the chip card bodies 100 are taken out of the frame units 80 of the holding frame 70 after the lamination plate 60 has been removed. Deviating from FIG. 5, the total number of frame units 80 and the number of frame units 80 per row and column of the holding frame 70 can be changed as required.

Figure 6:
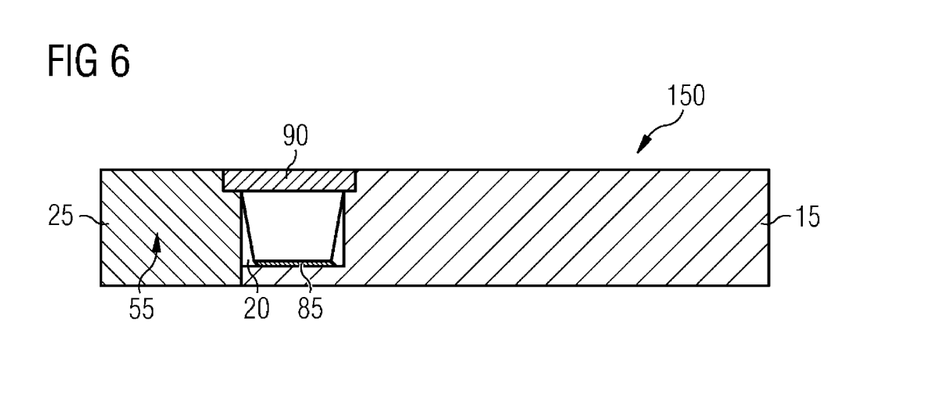
FIG. 6 is a cross-sectional view of a purely metallic dual-interface chip card 150.

FIG. 6 is a cross-sectional view of a dual-interface chip card 150 comprising the metallic core layer 15 according to FIG. 1C and a chip module 90 fixed in the cavity 20 of the metallic core layer 15, e.g., by means of an adhesive 85. The chip module 90 comprises a chip, preferably an RFID or an NFC chip, and an antenna coil coupled to the chip, preferably an inductively coupling antenna coil having at least one turn. The insert 55 or the filler according to FIG. 3 can be introduced into the slot 25 of the metallic core layer 15. Security features and/or patterns can be printed and/or lasered and/or adhered and/or embossed in or on the metallic multiple-copy sheet 10 according to FIGS. 1A and 1B or in or on the metallic core layer 15.

Figure 7:
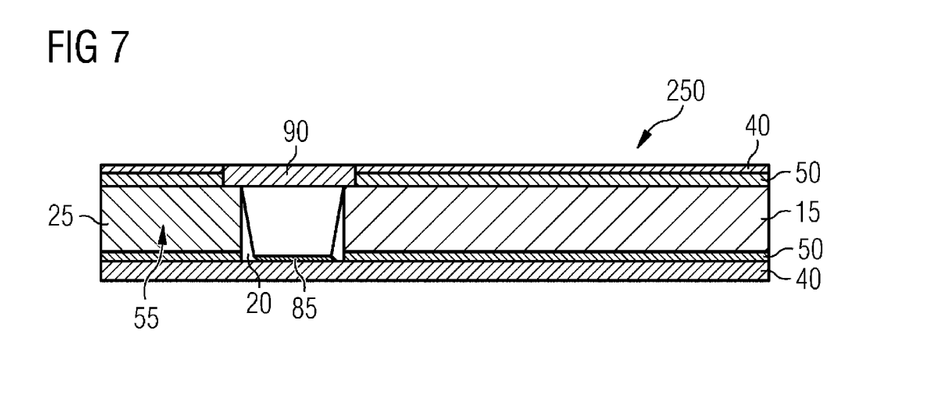
FIG. 7 is a cross-sectional view of a multi-layered contactless or dual-interface chip card 250 having the chip card body 100 according to FIGS. 3 and 4 and a chip module 90.

FIG. 7 is a cross-sectional view of a contactless or dual-interface chip card 250 similar to FIG. 6, but with the chip card body 100 according to FIGS. 3 and 4 and the chip module 90 fixed in the cavity 20 of the metallic core layer 15 and in the continuous chip module opening 75 of the upper cover layer 40. Before the chip module 90 is fixed, the insert 45 placed in the cavity 20 of the metallic core layer 15 or the filler material according to FIGS. 3 and 4 is removed.

Figure 8:
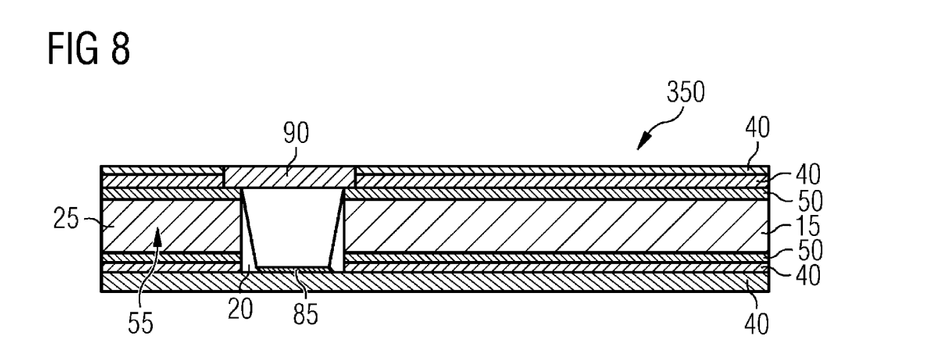
FIG. 8 is a cross-sectional view of a multi-layered contactless or dual-interface chip card 350 having the metallic core layer 15 according to FIG. 1C and four cover layers 40 according to FIG. 2.

FIG. 8 is a cross-sectional view of a contactless or dual-interface chip card 350 having the metallic core layer 15 according to FIG. 1C and four cover layers 40 according to FIG. 2 laminated with the metallic core layer 15. The chip card 350 according to FIG. 8 differs from the chip card 250 according to FIG. 7 in that two cover layers 40 are located above and two below the metallic core layer 15 according to FIG. 8. For example, the outer cover layers 40 can be transparent layers having a magnetic strip and/or a signature field and/or a hologram, and the middle cover layers 40 can have layers of printed patterns or other patterns. However, cover layers made of other materials, such as ceramic or wood, can also be used.

The invention claimed is:

1. A method for producing a chip card body having a metallic core layer for a contactless or dual-interface chip card, comprising the steps of:
   providing a metallic multiple-copy metal sheet for a plurality of metallic core layers;
   generating a corresponding plurality of cavities for fixing a corresponding plurality of chip modules;
   extracting the plurality of metallic core layers from the provided metallic multiple-copy sheet; and later
   generating at least one slot in one of the plurality of metallic core layers extracted from the metallic multiple-copy sheet.

2. The method according to claim 1, wherein the step of generating the corresponding plurality of cavities is carried out before or simultaneously with the extracting step.

3. The method according to claim 1, wherein, when the corresponding plurality of cavities are generated, the cavities re punched out.

4. The method according to claim 1, wherein, in the step of generating the corresponding plurality of cavities, the cavities are cut by means of a laser.

5. The method according to claim 1, wherein, in the extracting step, the plurality of metallic core layers are punched out of the metallic multiple-copy sheet.

6. The method according to claim 1, wherein, in the extracting step, the plurality of metallic core layers are cut out of the metallic multiple-copy sheet by means of a laser.

7. The method according to claim 1, wherein, in the step of generating the at least one slot, the at least one slot is cut by means of a laser.

8. The method according to claim 1, wherein, in the step of generating the at least one slot, the at least one slot is chemically etched.

9. The method according to claim 1, wherein, in the step of generating the at least one slot, the at least one slot is generated such that it extends from the cavity to an edge of the metallic core layer extracted from the metal multiple-copy sheet.

10. The method according to claim 1, wherein, in the step of generating the at least one slot, the at least one slot is generated such that it has a width between 30 μm and 100 μm.

11. The method according to claim 1, comprising the steps of:
   providing at least one cover layer;
   laminating the at least one cover layer with the extracted metallic core layer; and
   generating at least one continuous chip module opening in the at least one cover layer for fixing the chip module before or after the lamination step.

12. The method according to claim 11, wherein, in the step of providing the at least one cover layer, the at least one cover layer is extracted from a multiple-copy sheet for a plurality of cover layers.

13. The method according to claim 12, comprising the step of:
   prelaminating the provided multiple-copy sheet for the plurality of cover layers.

14. A method for producing a contactless or dual-interface chip card using the method for producing the chip card body according to claim 1, comprising the steps of:
   providing a chip module with a chip and an antenna coil coupled to the chip, and
   fixing the provided chip module in the cavity of the extracted metallic core layer.

15. A method for producing a contactless or dual-interface chip card using the method for producing the chip card body according to claim 11, comprising the steps of:
   providing a chip module with a chip and an antenna coil coupled to the chip, and
   fixing the provided chip module in the at least one continuous chip module opening of the at least one cover layer and in the cavity of the extracted metallic core layer.

\* \* \* \* \*